UNITED STATES PATENT OFFICE.

DAVID ACKART, OF SCHAGHTICOKE, NEW YORK.

IMPROVEMENT IN PRESERVING THE COLORS OF DRIED FRUITS.

Specification forming part of Letters Patent No. 119,442, dated October 3, 1871; antedated September 18, 1871.

*To all whom it may concern:*

Be it known that I, DAVID ACKART, of Schaghticoke, in the county of Rensselaer, State of New York, have discovered a new and useful Compound or Mixture for Preserving the Color and Flavor of Dried Fruit; and I do hereby declare the following to be a full and exact description of the ingredients thereof.

Take of sulphuric acid one ounce, and mix with one gallon of water, more or less, the quantity of sulphuric acid depending somewhat upon the acidity of the fruit. In this liquid immerse the fruit, immediately after it is prepared and before it changes color, allowing it to remain from ten to twenty seconds; then dry after the ordinary method.

The advantages we claim by this process are that the fruit will retain its natural color, also its natural flavor, and during the process of drying will not be troubled with flies lighting upon it.

What I claim as my discovery, and desire to secure by Letters Patent, is—

Sulphuric acid with water, in the manner and for the purposes above specified.

DAVID ACKART.

Witnesses:
 JOEL B. HAYDEN,
 JAMES NUTT.